3,265,101
LIQUEFIED GAS POURING VALVE IN GAS LIGHTER
Eini Shiozaki and Kenichi Katsumata, Tokyo, Japan, assignors to Mansei Kogyo Kabushiki Kaisha, Saitama, Japan
Filed Nov. 22, 1963, Ser. No. 325,627
Claims priority, application Japan, June 4, 1963, 38/28,360
1 Claim. (Cl. 141—295)

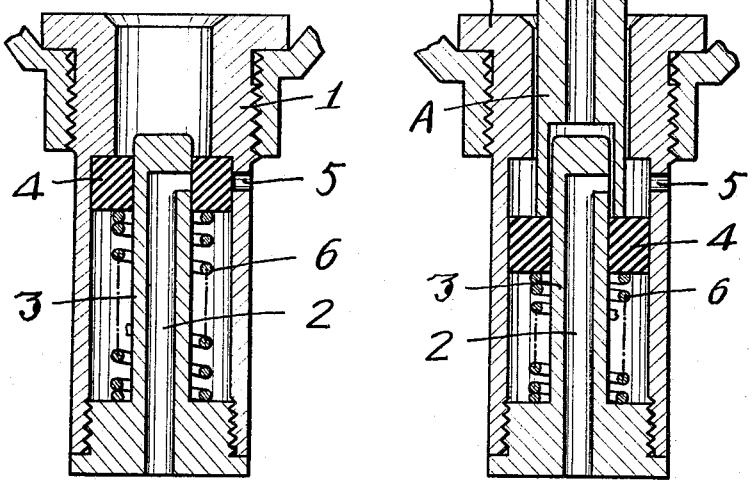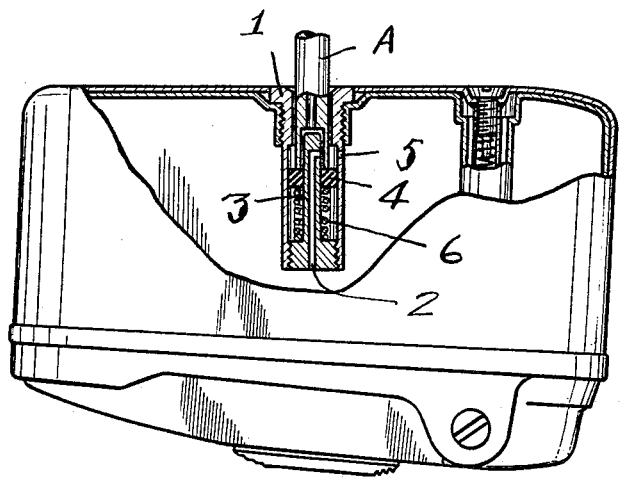

The present invention relates to an improved gas pouring valve, and more particularly, to a liquefied gas pouring valve adapted to be used in conjunction with a gas lighter in which liquefied gas is employed as fuel.

There is known in the prior art a variety of liquefied gas pouring valves adapted to be used in conjunction with gas lighters in which liquefied gas is employed as fuel. A common example of such fuel pouring valves comprises a stationary tubular member adapted to be fixedly threaded into or welded to the fuel reservoir of a lighter, a movable member adapted to frictionally move relative to said stationary member, and an annular sealing member which seals the pouring bore of said movable member and the air exhaust bore of said stationary member as its essential components.

In such a prior art fuel pouring valve, when the injection nozzle of a fuel supply bomb is inserted into the body of said valve and depressive pressure is applied to the valve, the movable member and sealing member are caused to move thereby to allow the liquefied gas to flow into the fuel reservoir of the lighter and at the same time the air within the fuel reservoir is allowed to discharge through the air exhaust bore.

The present invention represents improvements in such a prior art liquefied gas pouring type valve.

One object of the present invention is to provide an improved liquefied gas pouring valve which comprises stationary tubular members, an annular sealing member, and a spring as its essential components while eliminating a tubular movable member which is necessary in the similar type prior art valve.

Another object of the present invention is to provide an improved liquefied gas pouring valve which is simpler in its construction and less expensive in the manufacture thereof as compared with any of the corresponding prior art pouring valves.

A further object of the present invention is to provide an improved liquefied gas pouring valve which is more reliable and almost free from failure in its operation as compared with any of the corresponding prior art pouring valves.

The present invention provides a pouring valve adapted to be used in conjunction with a liquefied gas fueled lighter which comprises a stationary tubular member adapted to be fixedly secured to the fuel reservoir of said lighter and having an air exhaust bore therein a tubular guide member disposed within said stationary member and having a fuel pouring bore therein an annular sealing member disposed around the upper end portion of said guide member for frictional movement along the length of said guide member and adapted to seal said pouring bore of the guide member and said air exhaust bore of the stationary member, and a spring disposed around said guide member so as to normally maintain said annular sealing member in its uppermost sealing position whereby when said sealing member is depressed down by means of the nozzle of a fuel supply bomb against the action of said spring, liquefied gas is allowed to flow through said pouring bore of the guide member into the fuel reservoir of the lighter and at the same time the air within said fuel reservoir is allowed to discharge through said air exhaust bore of the fuel reservoir.

In order to facilitate understanding the present invention, reference will now be made to the appended drawings of a preferred specific embodiment of the present invention. Such drawings should not be construed as limiting the invention which is properly set forth in the appended sole claim.

In the drawings:

FIG. 1 is a vertically sectional view of a preferred embodiment of the present invention showing when the same is in its closed position; and FIG. 2 is a similar view to FIG. 1 but shows when the embodiment of FIG. 1 is in its opened position; and FIG. 3 is a view indicating the manner on the said embodiment built in a liquefied-gas-fueled lighter.

As illustrated in these figures, the fuel pouring valve of the present invention comprises a stationary tubular member 1 adapted to be fixedly secured to the fuel reservoir of a liquefied-gas-fueled lighter and having an air exhaust bore 5 therein, a tubular guide member 3 disposed within said stationary member and having a fuel pouring bore 2 therein, an annular sealing member 4 disposed around the upper end portion of said guide member for frictional movement along the length of said guide member and adapted to seal said pouring bore of the guide member and said air exhaust bore of the stationary member, and a spring 6 disposed around said guide member so as to normally maintain said annular sealing member at its uppermost sealing position.

In the operation of the novel fuel pouring valve of the present invention, when the annular sealing member 4 is depressed down by means of the nozzle A of a fuel supply bomb (not shown) against the action of said spring 6, the liquefied gas fuel from the supply bomb is allowed to flow through the pouring bore 2 of the guide member 3 into the fuel reservoir (not shown) of a lighter (not shown) and at the same time the air within the fuel reservoir is allowed to discharge through the air exhaust bore 5 of the stationary member 1.

As seen from the above, since the fuel pouring valve of the present invention is greatly simpler in its construction as compared with any of the corresponding prior art fuel pouring valves, the novel valve can be easily constructed and, accordingly, such a valve will be suitably constructed on a mass production base.

Furthermore, the novel pouring valve is more reliable in its operation and more efficient in its function as compared with any of the corresponding prior art fuel pouring valves.

It will be understood that the foregoing description and example is only illustrative of the present invention and it is not intended that the invention be limited thereto. All substitutions, alterations and modifications of the present invention which come within the scope of the following sole claim or to which the present invention is readily susceptible without departing from the spirit and scope of this disclosure are considered part of the present invention.

What is claimed is:

A fuel pouring valve adapted to be used in conjunction with a liquefied-gas-fueled lighter which comprises a stationary tubular member adapted to be fixedly secured to the fuel reservoir of said lighter, said stationary tubular member having an air exhaust bore therein; a tubular guide member fixedly secured to said stationary member and having a fuel pouring bore therein; an annular sealing member disposed around the upper end portion of said guide member for frictional movement along the length of the guide member and adapted to seal said pouring bore of the guide member and said air exhaust bore of the stationary member; and a spring disposed around said guide member so as to normally maintain said annular member in its uppermost sealing position whereby when said annular sealing member is depressed down by means of the nozzle of a fuel supply bomb against the action of said spring, liquefied gas from said supply bomb is allowed to flow through said pouring bore of the guide member into the fuel reservoir of the lighter and at the same time the air within the fuel reservoir is allowed to discharge through said air exahust bore of the stationary member.

References Cited by the Examiner

UNITED STATES PATENTS 2,769,325 11/1956 Storch _____ 141—325 X
3,133,565 5/1964 Ikeda _____ 141—293

FOREIGN PATENTS 497,301 9/1954 Italy.

LAVERNE D. GEIGER, *Primary Examiner.*

H. BELL, *Assistant Examiner.*